United States Patent
Ninan et al.

(10) Patent No.: US 9,576,555 B2
(45) Date of Patent: Feb. 21, 2017

(54) DISPLAYING IMAGES ON LOCAL-DIMMING DISPLAYS

(75) Inventors: Ajit Ninan, San Jose, CA (US); Wenhui Jia, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/704,688

(22) PCT Filed: Jun. 20, 2011

(86) PCT No.: PCT/US2011/041043
§ 371 (c)(1),
(2), (4) Date: Dec. 17, 2012

(87) PCT Pub. No.: WO2011/163114
PCT Pub. Date: Dec. 29, 2011

(65) Prior Publication Data
US 2013/0100178 A1 Apr. 25, 2013

Related U.S. Application Data

(60) Provisional application No. 61/357,044, filed on Jun. 21, 2010.

(51) Int. Cl.
*G09G 5/00* (2006.01)
*G09G 5/10* (2006.01)
(Continued)

(52) U.S. Cl.
CPC .............. *G09G 5/10* (2013.01); *G06T 5/009* (2013.01); *G06T 5/50* (2013.01); *G09G 3/3426* (2013.01);
(Continued)

(58) Field of Classification Search
CPC .. G09G 5/10; G09G 3/36; G09G 5/02; G09G 5/00; G09G 3/30; G09G 3/22;
(Continued)

(56) References Cited

U.S. PATENT DOCUMENTS 6,891,672 B2   5/2005  Whitehead
7,403,332 B2   7/2008  Whitehead
(Continued)

FOREIGN PATENT DOCUMENTS

CN   1954344 A   4/2007
EP   1827024     8/2007
(Continued)

OTHER PUBLICATIONS

Ward, G., et al. "JPEG-HDR: A Backwards-Compatible, High Dynamic Range Extension to JPEG" Proc. SIGGRAPH ACM 2006, New York, USA.
(Continued)

*Primary Examiner* — Ilana Spar
*Assistant Examiner* — Nguyen H Truong
(74) *Attorney, Agent, or Firm* — Fish & Richardson P.C.

(57) ABSTRACT

Displays, display components, image and video processing apparatus and related methods are described. A method for driving local-dimming displays comprises generating control values for driving pixels of a spatial light modulator from one image data component and generating control values for driving backlight elements from a second image data component. The first and second image data components may respectively comprise a tone map and a ratio image. Control values for the spatial light modulator and/or backlight may be obtained using cost effective hardware.

22 Claims, 6 Drawing Sheets

(51) Int. Cl.

| | | |
|---|---|---|
| *G09G 3/36* | (2006.01) | |
| *G06T 5/00* | (2006.01) | |
| *G06T 5/50* | (2006.01) | |
| *G09G 3/34* | (2006.01) | |
| *H04N 19/60* | (2014.01) | |
| *H04N 19/44* | (2014.01) | |
| *H04N 19/85* | (2014.01) | |

(52) U.S. Cl.
CPC ............ *H04N 19/44* (2014.11); *H04N 19/60* (2014.11); *H04N 19/85* (2014.11); *G06T 2207/20212* (2013.01); *G09G 3/36* (2013.01); *G09G 2320/0238* (2013.01); *G09G 2320/0242* (2013.01); *G09G 2320/0271* (2013.01); *G09G 2320/062* (2013.01); *G09G 2320/066* (2013.01); *G09G 2320/0646* (2013.01); *G09G 2340/02* (2013.01); *G09G 2340/0428* (2013.01)

(58) Field of Classification Search
CPC .... G06T 9/00; G06T 5/00; G06T 1/00; H05B 37/02; H04N 7/12; H04N 5/76; H04N 5/235; H04N 11/02; H04N 11/04; G06K 9/00; G06K 9/40
USPC .................................................. 345/102, 690
See application file for complete search history.

(56) References Cited

U.S. PATENT DOCUMENTS

| 8,217,970 | B2 | 7/2012 | Whitehead | |
|---|---|---|---|---|
| 2005/0248555 | A1 | 11/2005 | Feng | |
| 2006/0103621 | A1* | 5/2006 | Feng | ............................ 345/102 |
| 2007/0201560 | A1 | 8/2007 | Segall | |
| 2008/0129677 | A1 | 6/2008 | Li et al. | |
| 2008/0131016 | A1* | 6/2008 | Kokemohr | .................... 382/254 |
| 2008/0150853 | A1 | 6/2008 | Peng | |
| 2008/0192819 | A1* | 8/2008 | Ward et al. | .............. 375/240.02 |
| 2008/0297460 | A1* | 12/2008 | Peng et al. | ..................... 345/102 |
| 2009/0034868 | A1* | 2/2009 | Rempel et al. | ............... 382/264 |
| 2009/0135904 | A1 | 5/2009 | Francois | |
| 2009/0267879 | A1* | 10/2009 | Masuda | ............... G09G 3/3413 345/88 |
| 2009/0322800 | A1 | 12/2009 | Atkins | |
| 2010/0073338 | A1* | 3/2010 | Miller et al. | ................... 345/205 |
| 2010/0238189 | A1* | 9/2010 | Feng | ............................ 345/589 |

FOREIGN PATENT DOCUMENTS

| WO | 02/069030 | 9/2002 |
|---|---|---|
| WO | 03/077013 | 9/2003 |
| WO | 2005/104035 | 11/2005 |
| WO | 2005/107237 | 11/2005 |
| WO | 2006/010244 | 2/2006 |
| WO | 2006/066380 | 6/2006 |
| WO | 2008/092276 | 8/2008 |
| WO | 2008/145027 | 12/2008 |

OTHER PUBLICATIONS

Notification of Transmittal of the International Search Report and the Written Opinion of the Internationals Search Authority, or the Declaration, issued in PCT/US2011/041043 on Oct. 6, 2011, 11 pages.

Notification of Transmittal of the International Preliminary Report on Patentability issued in PCT/US2011/041043 on Sep. 24, 2013, 7 pages.

Office Action issued in CN201180030589.4 on Jul. 15, 2014, 8 pages (English Translation).

European Search Report, Application No. 15195367.6, dated Jun. 16, 2016, 9 pages.

* cited by examiner

United States Patent US 9,576,555 B2

DISPLAYING IMAGES ON LOCAL-DIMMING DISPLAYS

CROSS-REFERENCE TO RELATED APPLICATIONS

This application is the U.S. national stage of International Application PCT/US2011/041043 filed Jun. 20, 2011, which in turn claims priority to U.S. Provisional Patent Application No. 61/357,044, filed 21 Jun. 2010, hereby incorporated by reference in its entirety.

TECHNICAL FIELD

This invention relates to displays for displaying still or moving images. The invention relates specifically to 'local-dimming' or 'dual modulation' or 'multiple-modulation' displays.

BACKGROUND

Some displays incorporate backlights comprising arrays of light-emitters that can be individually controlled. Light from the backlight is modulated by a spatial light modulator ('SLM') such as an LCD panel to display images. Such displays can provide the advantage of increased contrast since the backlight may be locally dimmed in regions where an image is dark.

Some non-limiting examples of displays in which the amount of light incident on a spatial light modulator can be controlled are described in the following patents and patent applications:
  U.S. Pat. No. 6,891,672 issued 10 May 2005 and entitled High Dynamic Range Display Devices;
  U.S. Pat. No. 7,403,332 issued 22 Jul. 2008 and entitled High Dynamic Range Display Devices;
  United States Patent publication No. 2008/0180466 published 31 Jul. 2008 and entitled Rapid Image Rendering on Dual-modulator Displays;
  PCT Publication No. WO 2002/069030 published 6 Sep. 2002 and entitled High Dynamic Range Display Devices;
  PCT Publication No. WO 2003/077013 published 18 Sep. 2003 and entitled High Dynamic Range Display Devices;
  PCT Publication No. WO 2005/107237 published 10 Nov. 2005 and entitled Method for Efficient Computation of Image Frames for Dual Modulation Display Systems Using Key Frames;
  PCT Publication No. WO 2006/010244 published 2 Feb. 2006 and entitled Rapid Image Rendering on Dual-Modulator Displays.
  PCT Publication No. WO 2006/066380 published 29 Jun. 2006 and Entitled: Wide Color Gamut Displays; and
  PCT Publication No. WO 2008/092276 published 7 Aug. 2008 and entitled: Calibration of Displays Having Spatially-Variable Backlight;
all of which are hereby incorporated herein by reference for all purposes.

A backlit local dimming or dual modulator type display needs to have some mechanism for controlling elements of the backlight. It is desirable that the backlight be controlled in a manner that yields good quality images. At the same time, cost is an issue and so it is desirable to achieve control over backlight elements with less expensive hardware.

Ward et al., WO 2005/104035 ("Ward") published on 3 Nov. 2005 and entitled Encoding, Decoding and Representing High Dynamic Range Images describes a format that may be used for encoding high dynamic range images. The format provides a first part that contains a lower dynamic range version of an image and a second part that contains information that can be used to modify the lower dynamic range version of the image to recover a high dynamic range version of the image. Ward is hereby incorporated herein by reference for all purposes.

There remains a need for efficient ways to display images on displays having local-dimming backlights and for cost-effective local dimming displays that can provide good quality images.

Unless otherwise indicated, the reference to any approach or document in this section is not an admission that the approach or document constitutes prior art.

SUMMARY

The invention has a number of aspects. These include displays, image and video processing components that may be incorporated in displays, and image and video processing methods.

One aspect provides apparatus for driving local-dimming displays. The display may comprise a backlight comprising a plurality of individually-controllable elements and a spatial light modulator. The apparatus may optionally be integrated with a timing controller, backlight controller or other component of a signal processing path in the display. The apparatus comprises a decoder configured to extract first and second image data components that can be combined to yield a higher-dynamic-range version of an image. The first image data component comprises a lower-dynamic range version of the image. A first system of the apparatus is configured to generate first driving signals for the spatial light modulator based on the first image data component. A second system of the apparatus is configured to generate second driving signals for the backlight based on the second image data component or on a combination of the first and second image components.

The second system may comprise inter alia one or more of: a downsampler configured to downsample the second image data component; a driving value calculator configured to normalize the second image data component; and a linearizer.

In some embodiments the first image data comprises a tone map and the first system comprises a light field simulator configured to generate an estimated light field that would be produced at the spatial light modulator upon applying the second driving signals to drive the backlight; and a tone map modifier configured to modify the tone map according to the estimated light field.

The first system may comprise one or more image processing stages. Image processing stages may include, inter alia, one or more of: a color correction stage; and a sharpening filter.

Another aspect of the invention provides methods for driving local-dimming displays. The displays comprise a backlight and a spatial light modulator. The backlight comprises a plurality of individually-controllable elements. The method comprises obtaining first and second image data components that can be combined to yield a higher-dynamic-range version of an image. The first image data component comprises a lower-dynamic range version of the image. The method generates first driving signals for the spatial light modulator based on the first image data component and generates second driving signals for the backlight based on the second image data component or on a combination of the first and second image data components.

In some embodiments the method comprises clipping values of the second image data to a reference value.

Generating the second driving signals may comprise inter alia one or more of: downsampling the second image data; linearizing the second image data.

Generating the first driving signals may comprise image processing steps. The image processing steps may comprise, inter alia, one or more of: applying a sharpening filter to the first image data component; applying a color correction to the first image data component.

Another aspect of the invention provides non-transitory computer-readable media carrying computer-readable instructions which, when executed by a computer processor, cause the computer processor to execute a method for driving a local-dimming display. The display may be of a type that comprises a backlight comprising a plurality of individually-controllable elements and a spatial light modulator. The method comprises obtaining first and second image data components that can be combined to yield a higher-dynamic-range version of an image, the first image data component comprising a lower-dynamic range version of the image; generating first driving signals for the spatial light modulator based on the first image data component; and generating second driving signals for the backlight based on the second image data component or on a combination of the first and second image data components.

The foregoing aspects are non-limiting. Further aspects of the invention and features of example embodiments are illustrated in the accompanying drawings and the following detailed descriptions.

BRIEF DESCRIPTION OF THE DRAWINGS

The accompanying drawings illustrate example non-limiting embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
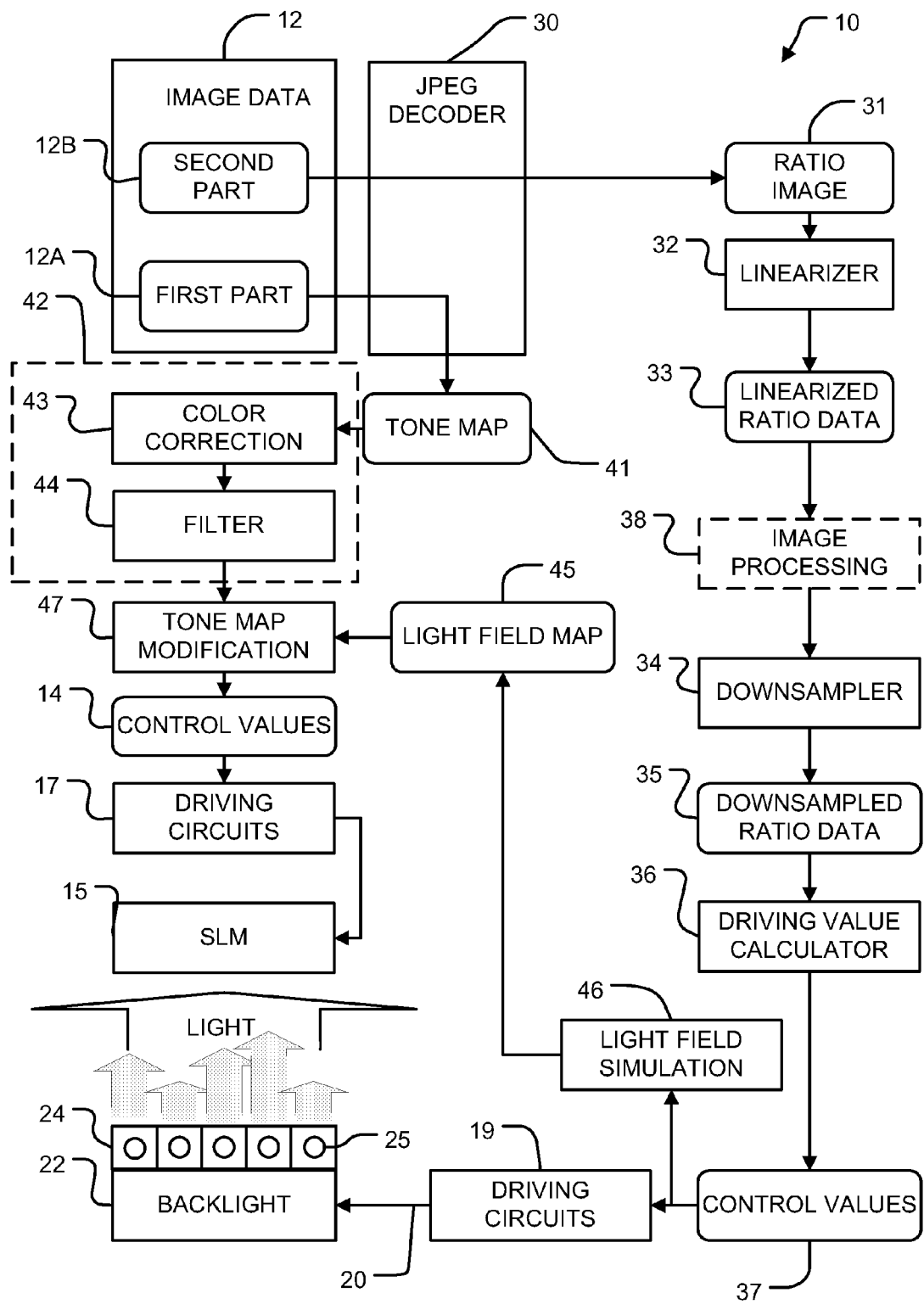
FIG. 1 is a block diagram illustrating display apparatus according to an example embodiment.

FIG. 1 illustrates apparatus 10 according to an example embodiment of the invention. Apparatus 10 receives as input image data 12 which includes a first part 12A and a second part 12B. First part 12A encodes a lower dynamic range version of a higher dynamic range image (e.g. a tone mapped version of the higher dynamic range image) and second part 12B contains information that may be applied in combination with first part 12A to provide the higher dynamic range version of the image. In some embodiments, second part 12B comprises values which may be applied to multiply pixel values (e.g. luminance values) provided by first part 12A to yield the higher dynamic range image. In some embodiments, second part 12B comprises an image having pixel values that are ratios of a pixel value of the higher dynamic range image to a pixel value of the lower dynamic range image. In some embodiments, second part 12B has the format of an image. In some such embodiments, second part 12B has a lower resolution than first part 12A. Second part 12B may be encoded by way of a suitable image codec. Parts 12A and 12B may, for example, comprise tone map data and ratio data as described by Ward.

Apparatus 10 generates control signals 14 for a spatial light modulator 15. An example of a spatial light modulator is an LCD panel. However, spatial light modulator 15 may be based on any technology. Control signals 14 may comprise, for example, values that correspond to luminance values for pixels of spatial light modulator 15.

Where spatial light modulator 15 is a color spatial light modulator such as a RGB LCD panel or an RGBW LCD panel in which pixels comprise colored sub-pixels then a set of control signals 14 may be provided to control subpixels of each type.

Control signals 14 may be applied directly to spatial light modulator 15 or applied by way of suitable driving circuits 17. Driving circuits 17 may, for example comprise a serial or parallel data bus connected to a suitable receiver on a controller, such as a timing control (T-CON) chip, that controls spatial light modulator 15. In some embodiments the bus comprises a low voltage differential signaling (LVDS) data path.

Apparatus 10 also generates control signals 20 for a backlight 22 comprising individually-controllable elements 24. Individually-controllable elements 24 are each configured to illuminate spatial light modulator 15 non-uniformly. For example when one of the individually-controllable elements 24 is controlled to emit light onto spatial light modulator 15 the distribution of the light on spatial light modulator 15 may provide a greatest light intensity in one area of spatial light modulator 15 corresponding to the particular individually-controllable element 24 and an intensity that falls off as one moves away from the corresponding area across spatial light modulator 15 according to a spread function. Spread functions for different individually-controllable elements 24 may overlap such that pixels of spatial light modulator 15 can receive light from a plurality of the individually-controllable elements 24.

Backlight control signals 20 control the intensity of light emitted by controllable elements 24 onto spatial light modulator 15. Control signals 20 may be applied directly to spatial light modulator 22 or applied by way of suitable driving circuits 19.

Controllable elements 24 may be arranged in a two-dimensional array comprising a plurality of rows and a plurality of columns of controllable elements 24. In some embodiments, individually-controllable elements 24 comprise light emitting semiconductor junctions such as light-emitting diodes (LEDs). In the illustrated example embodiment, backlight 22 comprises an array of LEDs 25 and each individually-controllable element 24 comprises one or more of the LEDs 25. In other embodiments, backlight 22 may comprise a backlight spatial light modulator and each individually-controllable element 24 may comprise one or more elements of the backlight spatial light modulator that can be controlled to pass varying amounts of light from a light source onto spatial light modulator 15.

One feature of the embodiment illustrated in FIG. 1 is that backlight control signals 20 are generated from second part 12B of image data 12. The particular processing for generating backlight control signals 20 from second part 12B will depend upon the nature of the data in second part 12B and on the way that data has been encoded.

In the illustrated embodiment, second part 12B comprises a JPEG-encoded ratio image and apparatus 10 comprises a JPEG decoder 30 that decodes second part 12B to provide ratio data 31. Ratio data 31 is represented in a non-linear scale and so JPEG decoder 30 is followed by a linearizer 32 which produces linearized ratio data 33. The linearized ratio data is downsampled, if necessary, to a resolution of the controllable elements 24 for which control signals 20 are to be generated by a downsampler 34. The downsampled ratio data 35 is provided to a driving value calculator that determines control values 37 to be applied to control individually-controllable backlight elements 24. In the illustrated embodiment, control values 37 control driving circuits 19 which generate control signals 20 according to the control values. Filters or other image processing stages 38 are optionally included in the path for generating control values 37.

Driving value calculator 36 may generate control values in various ways. In some embodiments control values for individually-controllable elements 24 are clipped to a predetermined value whenever the corresponding value(s) in the downsampled ratio data 35 exceed a threshold. The predetermined value may, for example, correspond to a value that sets the corresponding element 24 to be fully on (at a maximum brightness).

In some embodiments, driving value calculator 36 generates control values by a process that includes normalizing the ratio data. Normalizing may be done by, for example, dividing all values of the ratio data by a representative value. The representative value may comprise a maximum value, mean value, average value, median value, X percentile value or the like. In some embodiments values of the ratio data that are in excess of the representative value are clipped to the representative value.

Apparatus 10 includes a JPEG decoder 30 that decodes first part 12A of image data 12. The JPEG decoder 30 that decodes first part 12A may be the same as or different from the JPEG decoder that decodes second part 12B. The resulting tone map data 41 is optionally passed through one or more image processing stages 42. The image processing stages may include, for example, a color correction stage 43. Color correction stage 43, if present, may perform a color transformation on tone map data 41 (for example by multiplying color coordinate values by a suitable color transformation matrix) to compensate for color characteristics of backlight 22 and spatial light modulator 15.

A sharpening filter 44 is also optionally present. If both a sharpening filter 44 and a color correction stage 43 are present then sharpening filter 44 may be provided before or after color correction stage 43.

The resulting (optionally corrected and/or sharpened and/or subjected to other image processing) tone map data is processed to determine driving values for pixels of spatial light modulator 15. In the illustrated embodiment, this is done by performing a light field simulation based on the driving values in backlight control signal 20 to provide an estimated light field map 45 indicating the intensity of light from backlight 22 at each pixel of spatial light modulator 15 that would result from driving backlight 22 according to backlight driving signal 20. The light field simulation is performed by LFS stage 46.

Map 45 may be determined by, for each pixel of spatial light modulator 15 summing the light contributed to that pixel from each element 24 driven according to signal 20. This may be done using known spread functions for the elements 24. The spread functions depend on the optical characteristics of elements 24 as well as the dimensions and characteristics of the optical path from elements 24 to spatial light modulator 15.

There are various ways to reduce the computational and/or hardware expense for determining map 45. These include:

- computing map 45 at a resolution lower than that of spatial light modulator 15 and upsampling and/or interpolating to obtain map values corresponding to pixels of spatial light modulator 15;
- excluding from the calculation of light incident at a pixel of spatial light modulator 15 contributions from elements 24 that are far from the pixel;

Other mechanisms that may be used for facilitating efficient determination of map 45 are described in WO 2006/010244 filed on 27 May 2005 and entitled Rapid Image Rendering on Dual-modulator Displays which is hereby incorporated herein by reference for all purposes.

The tone map data is then modified according to map 45 to provide driving values 14 for pixels of spatial light modulator 15. Apparatus 10 provides tone map modification stage 47 that performs the modification.

Tone map modification stage 47 compensates for the fact that the pixels of spatial light modulator 15 are not necessarily illuminated with light of the same intensity. Instead, the intensity of light may vary from pixel to pixel. For example, consider the case where the tone map data indicates that the desired intensity of light from a pixel at location i, j on spatial light modulator 15 is $L_{ij}$ and map 45 indicates that the light incident at that pixel is $L'_{ij}$ then one can see that, assuming that $L'_{ij} > L_{ij}$ the pixel at location i, j should be controlled to attenuate the incident light by a factor $L_{ij}/L'_{ij}$. Thus, control values for the pixels of spatial light modulator 15 may be arrived at by dividing values in the tone map data by corresponding values in map 45 to determine the desired attenuation by each pixel of spatial light modulator 15 and then applying an electrooptical transfer function to provide control values for the spatial light modulator 15 that will yield the desired attenuation. Applying the transfer function may be performed using a lookup table.

In some embodiments LFS stage 46 is configured to produce an output map of the inverses of the intensity of light incident at pixels of spatial light modulator 15 (e.g. a map having values $1/L'_{ij}$). This permits the control values for the pixels of spatial light modulator 15 to be determined by performing multiplications. Multiplications are typically computationally less demanding and can be performed more simply in hardware than divisions.

The components of apparatus 10 may be provided in hardware, software (including firmware) or any suitable combination thereof. For example, in some embodiments control signals 14 and 20 are generated in a field-programmable gate array (FPGA) configured to provide functional components as illustrated in FIG. 1. In other embodiments, the functional components shown in FIG. 1 comprise software processes executable on one or more data processors. The data processors may comprise, for example, one or more microprocessors, image processors, digital signal processors, CPUs or the like. In other embodiments, some or all of the functional components illustrated in FIG. 1 are provided by hard-wired logic circuits, application specific integrated circuits or the like. Conveniently, apparatus 10 may be integrated with a display controller. For example, apparatus 10 or parts thereof may be provided in a timing control (T-CON) chip and/or an LED backlight driver.

Figure 2:
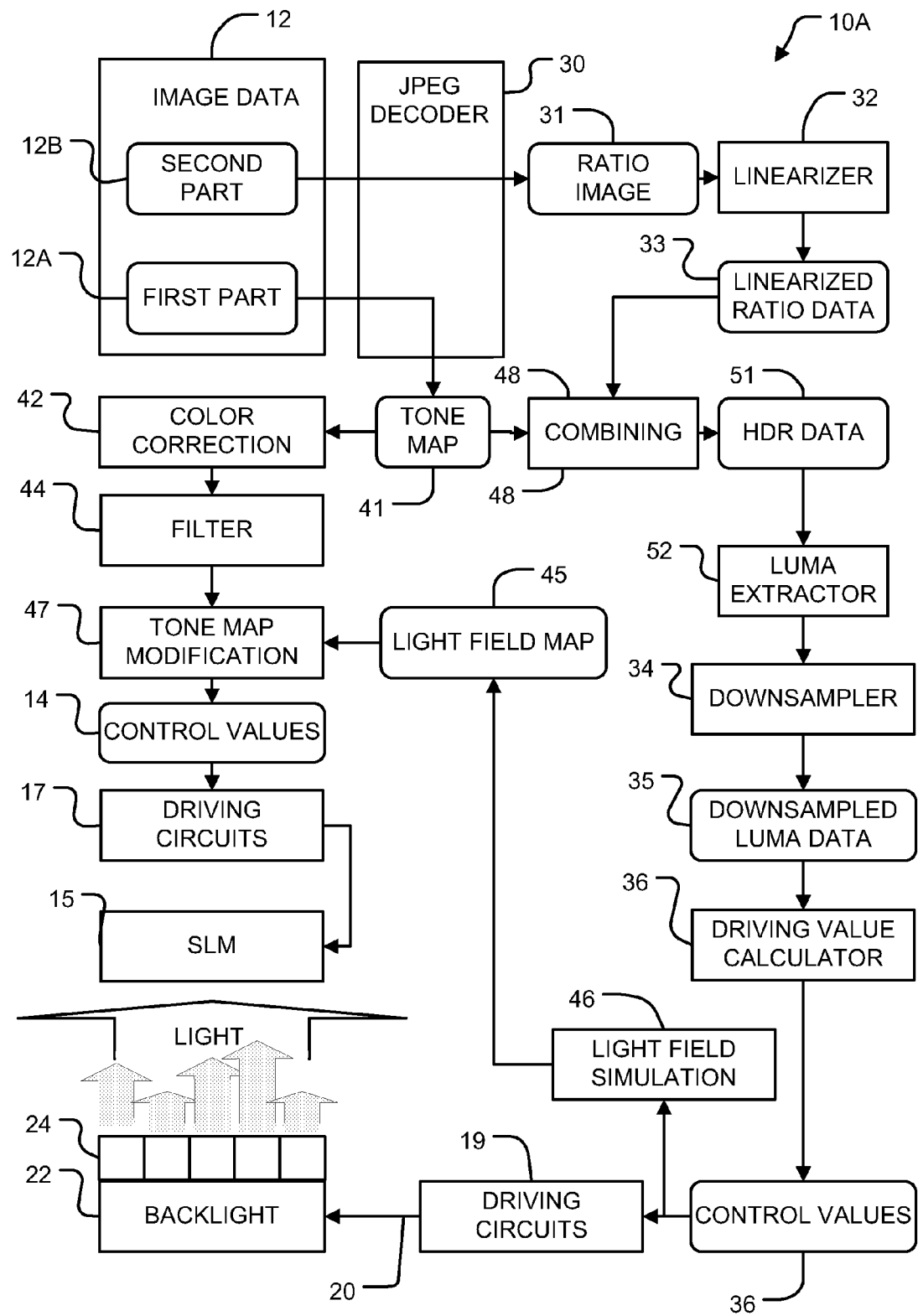
FIG. 2 is a block diagram illustrating display apparatus according to another example embodiment.

FIG. 2 shows an apparatus 10A that differs from apparatus 10 in that control signals 20 are based in part on first part 12A of image data 12. Components of apparatus 10A that have been described above in relation to FIG. 1 are identified by the same reference numbers used above. In apparatus 10A ratio data 31 is combined with tone map data 41 in combining stage 48. Combining stage 48 may multiply values in tone map data 41 by the corresponding values in ratio data 31 to yield HDR data 51. HDR data 51 is processed by a luma extractor 52 that extracts luminance values which are passed to downsampler 34. Apparatus 10A operates otherwise as described above in relation to apparatus 10. Apparatus 10A has the advantage over apparatus 10 that it may produce control signals 20 that yield backlight illumination that is closer to the desired final image than apparatus 10. This comes at the cost of providing combining stage 48 and luma extractor 52.

Figure 3:
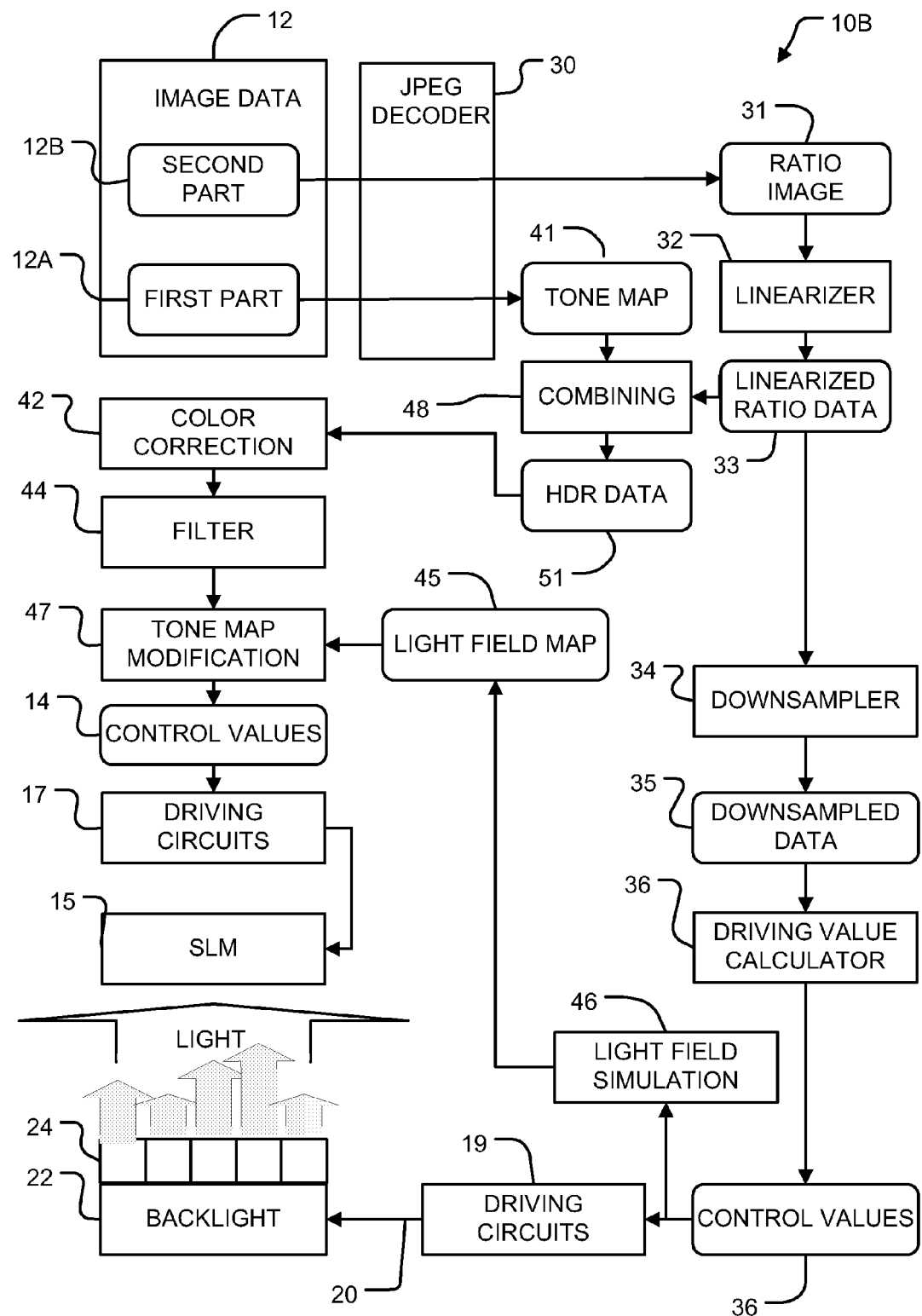
FIG. 3 is a block diagram illustrating display apparatus according to another example embodiment.

FIG. 3 shows an apparatus 10B according to a further alternative embodiment of the invention. Apparatus 10B is like apparatus 10 except that driving signals 14 for spatial light modulator 15 are based upon HDR data obtained by combining tone map data 41 and ratio data 31. In the illustrated embodiment, the combination is performed by a combining stage 48 which may operate as described above.

Figure 4:
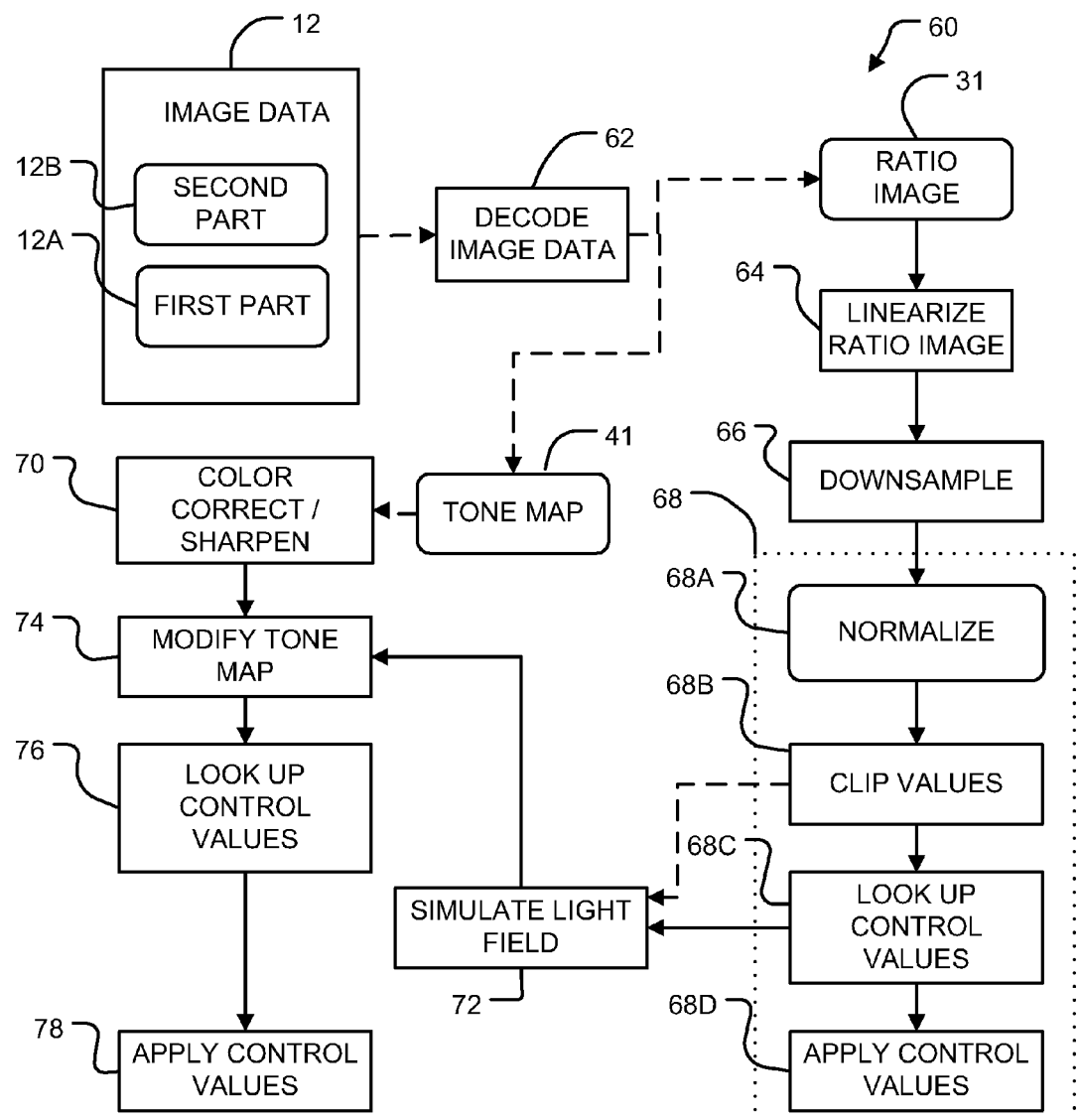
FIG. 4 is a flowchart illustrating a method according to an example embodiment.

FIG. 4 is a flowchart that illustrates the operation of an example method 60 for driving a display to display an image according to image data 12 comprising a first part 12A and a second part 12B as described above. In block 62, first and second parts 12A and 12B are decoded. In the illustrated embodiment, this yields a ratio image 31 and a tone map 41.

In block 64, ratio image 31 is linearized. In block 66, ratio image 31 is downsampled. In block 68, a backlight driving signal is determined based on the downsampled ratio image. In the illustrated embodiment, block 68 comprises normalizing the downsampled ratio image in block 68A, clipping values to a clipping level in block 68B, and, in block 68C looking up control values for elements 24 corresponding to the values in the output from block 68B. In block 68D the control values are applied to drive backlight elements 24. In embodiments which include both blocks 68A and 68B, blocks 68A and 68B may be performed in either order.

In block 70 tone map data 41 is optionally color corrected and/or sharpened. In block 72 a light field simulation is performed for the control values of block 68C (in the alternative, the light field simulation may be based on the output of block 68B). The light field simulation yields an estimate of the distribution of light from backlight 22 at spatial light modulator 15 when elements 24 of backlight 22 are driven using the set of control values output from block 68C. The estimate produced by block 72 may comprise a map indicating the light intensity (or a function of the light intensity such as the inverse of the light intensity) for pixels of spatial light modulator 15.

In block 74, the tone map data is modified according to the estimate to yield values corresponding to the pixels of spatial light modulator 15. Block 74 may comprise, for example, multiplying or dividing a pixel value of the tone map data by a corresponding value from the estimate. For example, block 74 may comprise, for pixels of spatial light modulator 15, multiplying a luminance specified by the tone map data by the inverse of a light intensity from the estimate.

In block 76 the values output by block 74 are used to look up corresponding control values for the pixels of spatial light modulator 15. In block 78 the control values are applied to drive spatial light modulator 15.

Figure 5:
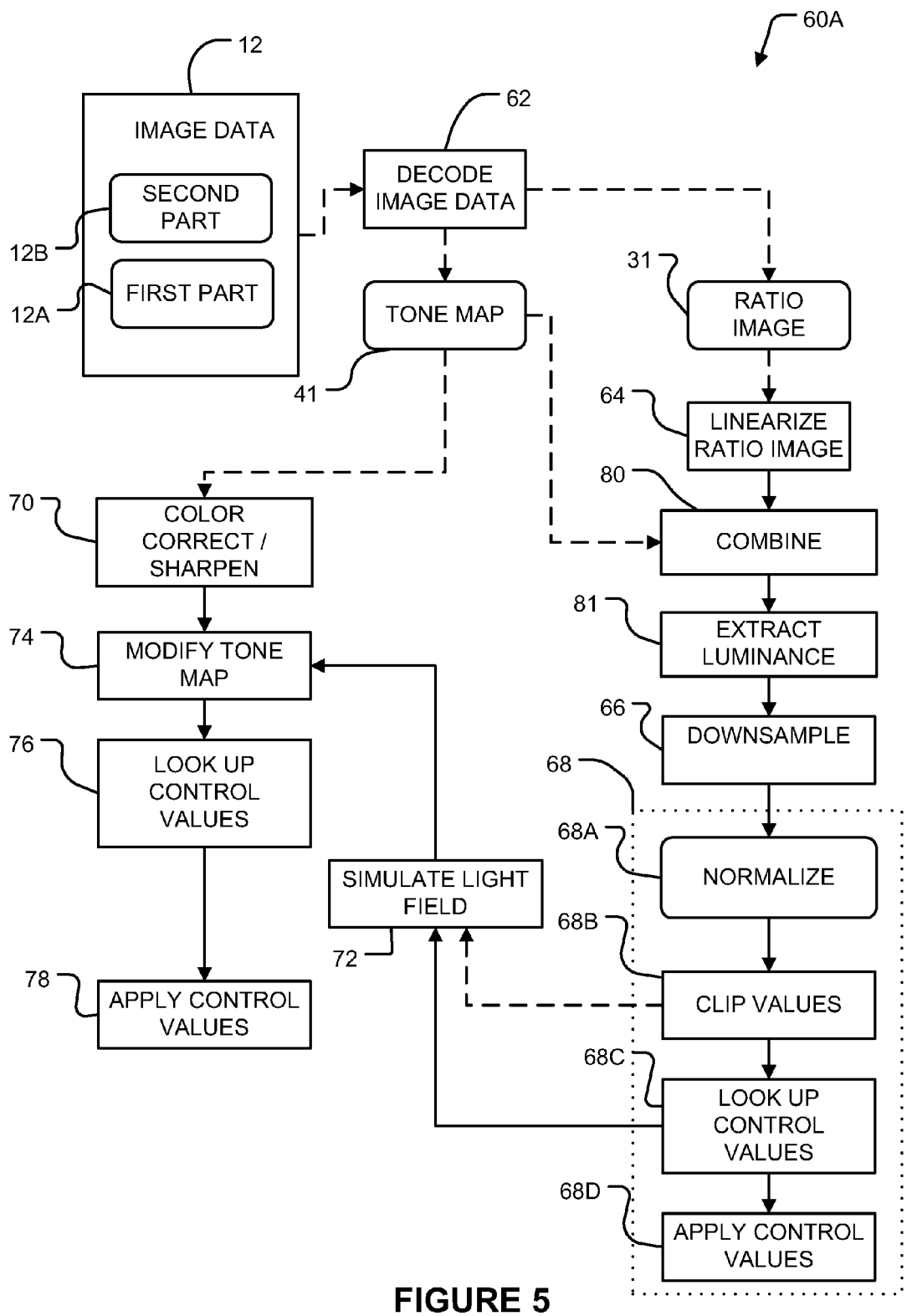
FIG. 5 is a flowchart illustrating a method according to another example embodiment.

FIG. 5 is a flowchart illustrating a method 60A that is similar to method 60 except that ratio data 31 and tone map data 41 are combined before backlight control signals are generated. In block 80, ratio data and tone map data are combined (for example by multiplying luminance values in the tone map data by corresponding values in the ratio image). In block 81 luminance information is extracted from the combined ratio data and tone map data. The control values for the backlight are generated based on the extracted luminance information. Method 60A is otherwise similar to method 60.

Methods 60 and 60A have the advantage that, in each case it is unnecessary to perform a tone mapping operation (which is typically computationally and/or hardware intensive) after extracting parts 12A and 12B of image data 12.

Figure 6:
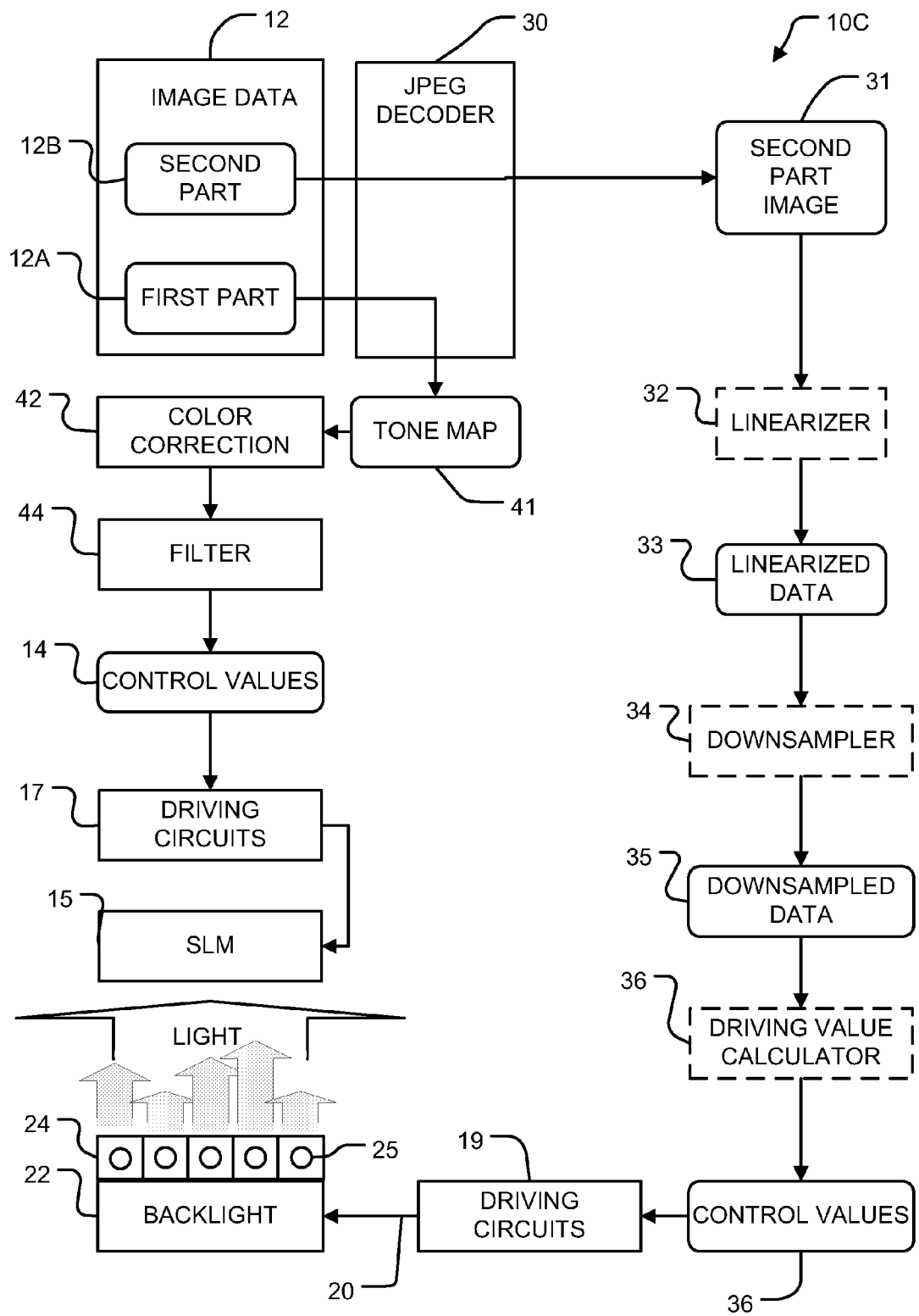
FIG. 6 is a block diagram illustrating display apparatus according to another example embodiment.

FIG. 6 shows apparatus 10C which is similar to apparatus 10 of FIG. 1 except that blocks 45, 46 and 47 are not provided. Apparatus 10C is less complicated than apparatus 10. For optimum performance of apparatus 10C image decomposition for dual modulation may be been performed or prepared at or upstream from the encoding of image data 12. Second part 12B may contain image data that has been deliberately created to permit backlight drive values to be derived directly from second part 12B. Drive values for a light modulator may be derived from first part 12A. In the architecture of apparatus 10C, there is no connection between the signal path by which second part 12B is processed to obtain backlight drive values and the signal path by which first part 12A is processed to obtain SLM drive values. This embodiment aims to display original HDR content with a reduced amount of hardware.

In some embodiments, second part 12B may be configured such that linearization and downsampling of the second part are not required or are simple to perform. For example, second part 12B may comprise an image that has a resolution of the independently-controllable elements of a backlight in which pixel values comprise driving values for the elements of the backlight. In some embodiments, second part 12B may comprise image data having a resolution slightly greater than that of the independently-controllable elements of a backlight. Second part 12B may then be downsampled to resolutions appropriate for driving different displays on which it might be desirable to display image data 12.

Methods and apparatus as described herein are not limited to the display and/or preparation for display of still images but may be applied to the display and/or preparation for display of video images as well.

Methods like methods 60 and 60A may be applied to allow local-dimming or dual modulation displays to use high dynamic range information from image data to drive controllable elements of a backlight in a manner that is efficient and can be implemented in cost-effective hardware (whether or not the displays generate or display high dynamic range images). Some such methods can be practiced without combining the first and second image components. Some such methods avoid tone mapping in the data path for generating control signals for elements of a spatial light modulator in a local dimming display. Methods and apparatus as described herein provide design options for manufacturers of displays and/or video or image processing hardware.

Certain implementations of the invention comprise computer processors which execute software instructions which cause the processors to perform a method of the invention.

For example, one or more processors in a display or image data processor upstream from a display may implement the methods of FIG. 4 or 5 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, non-transitory physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. Apparatus for driving a local-dimming display comprising a backlight and a spatial light modulator, the backlight comprising a plurality of individually-controllable elements, the apparatus comprising:
   a decoder configured to:
      receive, from an encoder, image data comprising (i) a first image data component comprising a low-dynamic range version of an image; and (ii) a second image data component comprising values that can be used to modify the low-dynamic range version of the image to recover a high-dynamic range version of the image, wherein the low-dynamic range version of the image is a tone-mapped image of the high-dynamic range version of the image, and wherein the values that can be used to modify the low-dynamic range version of the image are linearized ratio data; and
      extract, from the image data, the first image data component and the second image data component;
   a first system configured to generate, using the first image data component and without using the high-dynamic range version of the image, first driving signals for the spatial light modulator; and
   a second system configured to:
      combine the tone-mapped image and the linearized ratio data by multiplying values in the tone-mapped image by corresponding values in the linearized ratio data to generate a high-dynamic range image;
      extract luminance values of the high-dynamic range image;
      down-sample the luminance values of the high-dynamic range image to generate down-sampled data and
      generate, using the second image data component and without using the high-dynamic range version of the image, second driving signals for controlling the individually controllable elements of the backlight by generating the second driving signals based on the down-sampled data.

2. Apparatus according to claim 1 wherein the second system comprises a downsampler configured to down-sample the luminance values of the high-dynamic range image to generate down-sampled data.

3. Apparatus according to claim 1 wherein the second system comprises a driving value calculator configured to normalize the second image data component.

4. Apparatus according to claim 3 wherein the driving value calculator is configured to normalize the second image data component by dividing values of the second image data by a representative value.

5. Apparatus according to claim 4 wherein the representative value comprises a maximum value, mean value, average value, median value, or percentile value.

6. Apparatus according to claim 4 wherein the driving value calculator is configured to clip the values of the second image component to the representative value.

7. Apparatus according to claim 1 wherein the second system comprises a linearizer.

8. Apparatus according to claim 1 wherein the first system comprises:
   a light field simulator configured to generate an estimated light field that would be produced at the spatial light modulator upon applying the second driving signals to drive the backlight; and
   a tone map modifier configured to modify the tone-mapped image according to the estimated light field.

9. Apparatus according to claim 1 wherein the second image data component has a resolution lower than a resolution of the first image data component.

10. Apparatus according to claim 1 wherein the first system comprises a color correction stage.

11. Apparatus according to claim 1 wherein the first system comprises a sharpening filter.

12. Apparatus according to claim 1, wherein the first system is further configured to generate the first driving signals based on the second image data component.

13. A method for driving a local-dimming display comprising a backlight and a spatial light modulator, the backlight comprising a plurality of individually-controllable elements, the method comprising:
   obtaining, from an encoder, image data comprising (i) a first image data component comprising a low-dynamic range version of an image; and (ii) a second image data component comprising values that can be used to modify the low-dynamic range version of the image to recover a high-dynamic range version of the image, wherein the low-dynamic range version of the image is a tone-mapped image of the high-dynamic range version of the image, and wherein the values that can be used to modify the low-dynamic range version of the image are linearized ratio data;
   extracting, from the image data, the first image data component and the second image data component;
   generating, using the first image data component and without using the high-dynamic range version of the image, first driving signals for the spatial light modulator;

combining the tone-mapped image and the linearized ratio data by multiplying values in the tone-mapped image by corresponding values in the linearized ratio data to generate a high-dynamic range image;

extracting luminance values of the high-dynamic range image;

down-sampling the luminance values of the high-dynamic range image to generate down-sampled data; and generating, using the second image data component and without using the high-dynamic range version of the image, second driving signals for controlling the individually controllable elements of the backlight by generating the second driving signals based on the down-sampled data.

14. A method according to claim 13 comprising clipping values of the second image data to a reference value.

15. A method according to claim 13 wherein the second image data component has a resolution lower than a resolution of the first image data component.

16. A method according to claim 13 wherein generating the second driving signals comprises linearizing the second image data component.

17. A method according to claim 13 wherein generating the first driving signals comprises applying a sharpening filter to the first image data component.

18. A method according to claim 13 wherein generating the first driving signals comprises applying a color correction to the first image data component.

19. A display apparatus comprising:
a backlight comprising a plurality of individually controllable elements;
a spatial light modulator configured to receive light from the plurality of individually controllable elements of the backlight;
a decoder configured to:
receive, from an encoder, image data comprising (i) a first image data component comprising a low-dynamic range version of an image; and (ii) a second image data component comprising values that can be used to modify the low-dynamic range version of the image to recover a high-dynamic range version of the image, wherein the low-dynamic range version of the image is a tone-mapped image of the high-dynamic range version of the image, and wherein the values that can be used to modify the low-dynamic range version of the image are linearized ratio data; and
extract, from the image data, first image data component and the second image data component;
a first system configured to generate, using the first image data component and without using the high-dynamic range version of the image, first driving signals for the spatial light modulator; and
a second system configured to:
combine the tone-mapped image and the linearized ratio data by multiplying values in the tone-mapped image by corresponding values in the linearized ratio data to generate a high-dynamic range image;
extract luminance values of the high-dynamic range image;
down-sample the luminance values of the high-dynamic range image to generate down-sampled data; and
generate, using the second image data component and without using the high-dynamic range version of the image, second driving signals for controlling the individually controllable elements of the backlight by generating the second driving signals based on the down-sampled data.

20. Apparatus for driving a local-dimming display comprising a backlight and a spatial light modulator, the backlight comprising a plurality of individually-controllable elements, the apparatus comprising:
a decoder configured to:
receive, from an encoder, image data comprising (i) a first image data component comprising a tone-mapped image of a high-dynamic range version of the image; and (ii) a second image data component comprising linearized ratio data that can be used to modify the tone-mapped image to recover the high-dynamic range version of the image; and
extract, from the image data, the first image data component and the second image data component;
a first system configured to:
combine the tone-mapped image and the linearized ratio data by multiplying values in the tone-mapped image by corresponding values in the linearized ratio data to generate a high-dynamic range image; and
generate, based on the generated high-dynamic range image, first driving signals for the spatial light modulator; and
a second system configured to generate, using the second image data component and without using the high-dynamic range version of the image, second driving signals for controlling the individually controllable elements of the backlight.

21. A method for driving a local-dimming display comprising a backlight and a spatial light modulator, the backlight comprising a plurality of individually-controllable elements, the method comprising:
obtaining, from an encoder, image data comprising (i) a first image data component comprising a tone-mapped image of a high-dynamic range version of the image; and (ii) a second image data component comprising linearized ratio data that can be used to modify the tone-mapped image to recover the high-dynamic range version of the image;
extracting, from the image data, the first image data component and the second image data component;
combining the tone-mapped image and the linearized ratio data by multiplying values in the tone-mapped image by corresponding values in the linearized ratio data to generate a high-dynamic range image;
generating, based on the generated high-dynamic range image, first driving signals for the spatial light modulator; and
generating, using the second image data component and without using the high-dynamic range version of the image, second driving signals for controlling the individually controllable elements of the backlight.

22. A display apparatus comprising:
a backlight comprising a plurality of individually controllable elements;
a spatial light modulator configured to receive light from the plurality of individually controllable elements of the backlight;
a decoder configured to:
receive, from an encoder, image data comprising (i) a first image data component comprising a tone-mapped image of a high-dynamic range version of the image; and (ii) a second image data component comprising linearized ratio data that can be used to modify the tone-mapped image to recover the high-dynamic range version of the image; and extract, from the image data, the first image data component and the second image data component;

a first system configured to:

combine the tone-mapped image and the linearized ratio data by multiplying values in the tone-mapped image by corresponding values in the linearized ratio data to generate a high-dynamic range image; and generate, based on the generated high-dynamic range image, first driving signals for the spatial light modulator; and a second system configured to generate, using the second image data component and without using the high-dynamic range version of the image, second driving signals for controlling the individually controllable elements of the backlight.

\* \* \* \* \*